US005840150A

United States Patent [19]
Brown

[11] Patent Number: 5,840,150

[45] Date of Patent: Nov. 24, 1998

[54] GLUE APPLICATOR FOR USE IN PAPER CORE MANUFACTURE

[76] Inventor: Billy E. Brown, P.O. Box 879, Hwy. 280 By-Pass West, Alexander City, Ala. 35010

[21] Appl. No.: 585,043

[22] Filed: Jan. 11, 1996

[51] Int. Cl.[6] .................................................. B32B 31/00

[52] U.S. Cl. ........................................ 156/324; 156/443

[58] Field of Search ................................. 156/578, 443, 156/459, 324; 118/224, 248, 253, 261

[56] References Cited

U.S. PATENT DOCUMENTS

| | | | |
|---|---|---|---|
| 2,681,636 | 6/1954 | Fridolph | 118/261 X |
| 3,576,154 | 4/1971 | Brockmuller | 493/196 |
| 3,616,027 | 10/1971 | Honsel | 156/265 |
| 3,693,313 | 9/1972 | Sextone | 53/399 |
| 4,433,694 | 2/1984 | Seragnoli | 131/92 |

*Primary Examiner*—Francis J. Lorin
*Attorney, Agent, or Firm*—Mark Clodfelter

[57] ABSTRACT

A glue applicator for applying glue to a paper web used in the manufacture of paper cores is disclosed. A drive roller having a surface of frictional character rotates a glue applicator roller and a doctor roller, these rollers coupled by sprockets and a chain. The doctor roller is adjustable so that a gap between the doctor roller and glue applicator roller may be adjusted, adjusting thickness of a layer of glue applied to the paper web. A motor having an overrunning clutch is coupled to the glue applicator roller and doctor roller, so that during intervals when the paper web is not passing through the glue applicator, the glue applicator roller may be continuously rotated in liquid glue, preventing glue from hardening on the glue applicator roller and doctor roller.

18 Claims, 5 Drawing Sheets

GLUE APPLICATOR FOR USE IN PAPER CORE MANUFACTURE

FIELD OF THE INVENTION

This invention relates to glue applicators used in the manufacture of paper cores around which other paper products, such as paper towels, toilet paper, etc are wound, and particularly to such a glue applicator wherein the amount of glue applied to a paper web is precisely controlled by a doctor roller closely spaced to a glue applicator roller having a lower periphery immersed in a glue reservoir.

BACKGROUND OF THE INVENTION

In the manufacture of paper cores, which are cardboard tubes around which paper products are wound, the paper core is constructed of two webs of inexpensive kraft-type paper about 3 inches in width. Typically, one of the paper webs receives a water-soluable glue of a thick, viscus character on one side and is spirally wound into a tube, with the other paper web oppositely spiraled about the tube formed by the first web and bonded thereto. The paper core is wound as a continuous tube, which is cut to a desired length according to the particular paper product. In a typical paper core manufacturing facility, the paper webs are wound at a maximum rate of about 250 feet per minute of the webs.

In these paper core manufacturing facilities, the glue is continuously applied to one of the paper webs by a glue applicator apparatus which uses a glue applicator roller having a lower periphery immersed in liquid glue contained in a glue reservoir. The surface of the applicator roller is textured, as by knurling, so as to pick up and hold a relatively large quantity of glue. The paper web is passed over a portion of the upper periphery of the roller, causing the glue applicator roller to rotate. As the roller rotates, a relatively large quantity of glue from the glue reservoir adheres to the roller and is transferred to the paper web. After passing over the glue applicator roller, the paper web passes over a doctor blade, which scrapes excess glue from the paper web, this excess glue dripping back into the glue reservoir. Tension is applied to the paper web by a hinged container adapted to ride on the paper web, with weights placed in the container to increase or decrease the tension. In general, the aforementioned maximum speed of 250 feet per minute at which the paper webs are wound into paper cores is limited by the glue applicator apparatus, the paper winder being capable of operating at approximately twice this speed. This limitation is due to the paper web driving the glue applicator roller, which as stated picks up a large quantity of glue, which can act as a lubricant on the glue applicator roller. As such, when faster speeds of the paper web are attempted, slippage of the paper web over the glue applicator roller occurs, causing a nonuniform layer of glue being applied to the paper web.

Another problem with this system is that the doctor blade inefficiently scrapes excess glue from the paper web, resulting in excess glue being applied to the web. Further, as a result of using a doctor blade to scrape the paper, excess glue adheres to edges of the paper web, which is then transferred to guide rollers downstream from the glue applicator roller, necessitating frequent cleaning of these guide rollers. Also, as the paper web itself is an inexpensive paper product which varies in density and thickness, the layer of glue applied to the web is not uniform. Further, when the manufacturing process is temporarily halted, glue on the applicator roller immediately begins to harden, requiring that at least the glue applicator roller be cleaned prior to the manufacturing process being restarted. Further yet, and over a period of operation of two to three weeks, glue becomes spattered over virtually every part of the glue applicator, requiring that the applicator be cleaned after every two or three weeks of use. In continued use without these periodic cleanings, glue migrates into various antifriction bearings of the rollers, causing the glue applicator to eventually become inoperative.

In view of the foregoing, it is an object of the invention to provide a glue applicator used in conjunction with a paper core winder which applies a thin, uniform layer of glue to the paper web, greatly reducing consumption of glue. It is a further object of the invention to provide a glue applicator constructed so that constant rotation of the glue applicator roller is maintained during relatively short maintainance intervals or resupply of the paper web. It is yet a further object of the invention to provide a gluing apparatus for use in conjunction with a paper core winder which will allow the paper core winder to operate at a faster speed than has heretofore been possible.

SUMMARY OF THE INVENTION

A frame is provided for rotatably supporting a glue applicator roller having a lower periphery submerged in glue contained in a glue reservoir, with a doctor roller adjustably positioned in close proximity to the glue applicator roller. A drive roller is also supported by the frame, with the drive roller, glue applicator roller, and doctor roller rotatably coupled together so that rotation of the drive roller causes rotation of the doctor roller and glue applicator roller. Wipers are supported by the frame, and wipe glue from sides of the glue applicator roller and doctor roller.

DETAILED DESCRIPTION OF THE DRAWINGS

Figure 1:
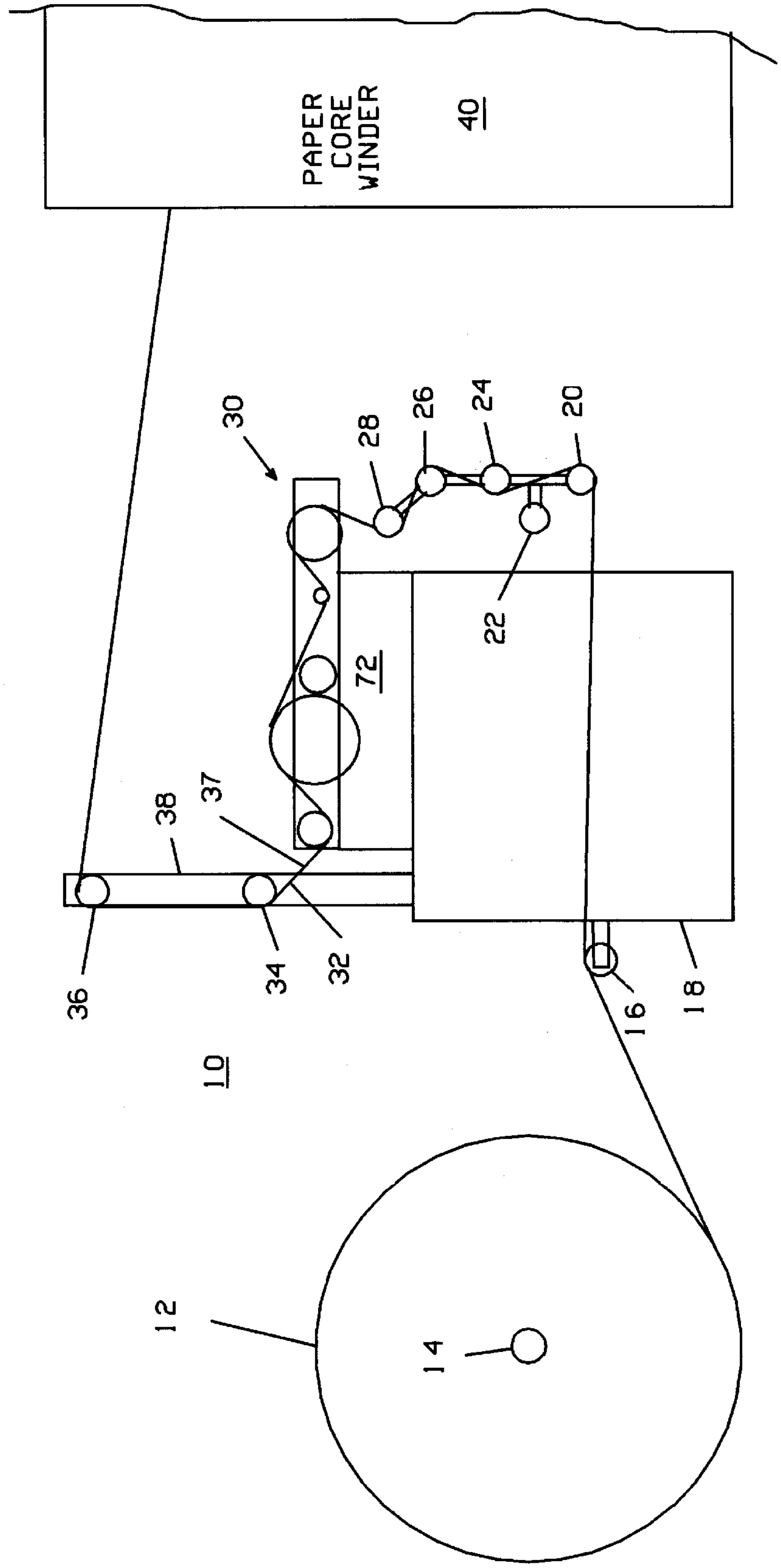
FIG. 1 is a block diagram of a paper core manufacturing facility.

Referring initially to FIG. 1, an example of a paper core manufacturing facility 10 is shown. Here, a roll 12 of inexpensive kraft-type paper about 3 inches wide is conventionally supported in rotatable relation by means not shown about an axis 14. The paper is drawn from a lower side of roll 12, and passed over a guide roller 16 in preparation for gluing. Roller 16 is supported by a base 18, with the paper passing through base 18 to guide roller 20 supported on an opposite end of base 18. The paper then passes through tensioning and decurling rollers 22, 24, 26, and 28, which are conventionally supported by brackets secured to base 18. Rollers 22, 24, 26, and 28 tire each provided with a crown which keeps the paper centered on these rollers, and further removes any curl in the paper web. Additionally, tension of the paper web downstream from rollers 20, 22, 24, 26, and 28 may be increased or decreased by threading the paper web through more or fewer of rollers 22, 24, 26, and 28, respectively. Here, maximum tension may be provided by threading the paper web around four of rollers 20, 22, 24, 26, and 28, while a least amount of tension may be provided by threading the paper web around one or two of rollers 20, 22, 24, 26, and roller 28, such as passing the web around rollers 24 and 28.

The paper web then passes through glue apparatus 30, where a thin, uniform layer of glue is applied to side 32 of the paper web. After glue is applied to surface 32, the paper is passed over rollers 34 and 36 supported by upright members 38 (only 1 shown), with the unglued side 37 of the paper web contacting rollers 34 and 36. The paper is then wound in conjunction with another paper web (not shown) into a paper core by a conventional paper core winding machine 40, after which the paper core is cut into discrete lengths about which other paper products, such as toilet paper, are wound. The web of paper is pulled through gluing apparatus 30 by paper core winding machine 40, with the pulling force applied to the paper web driving rollers of apparatus 30.

Figure 2:
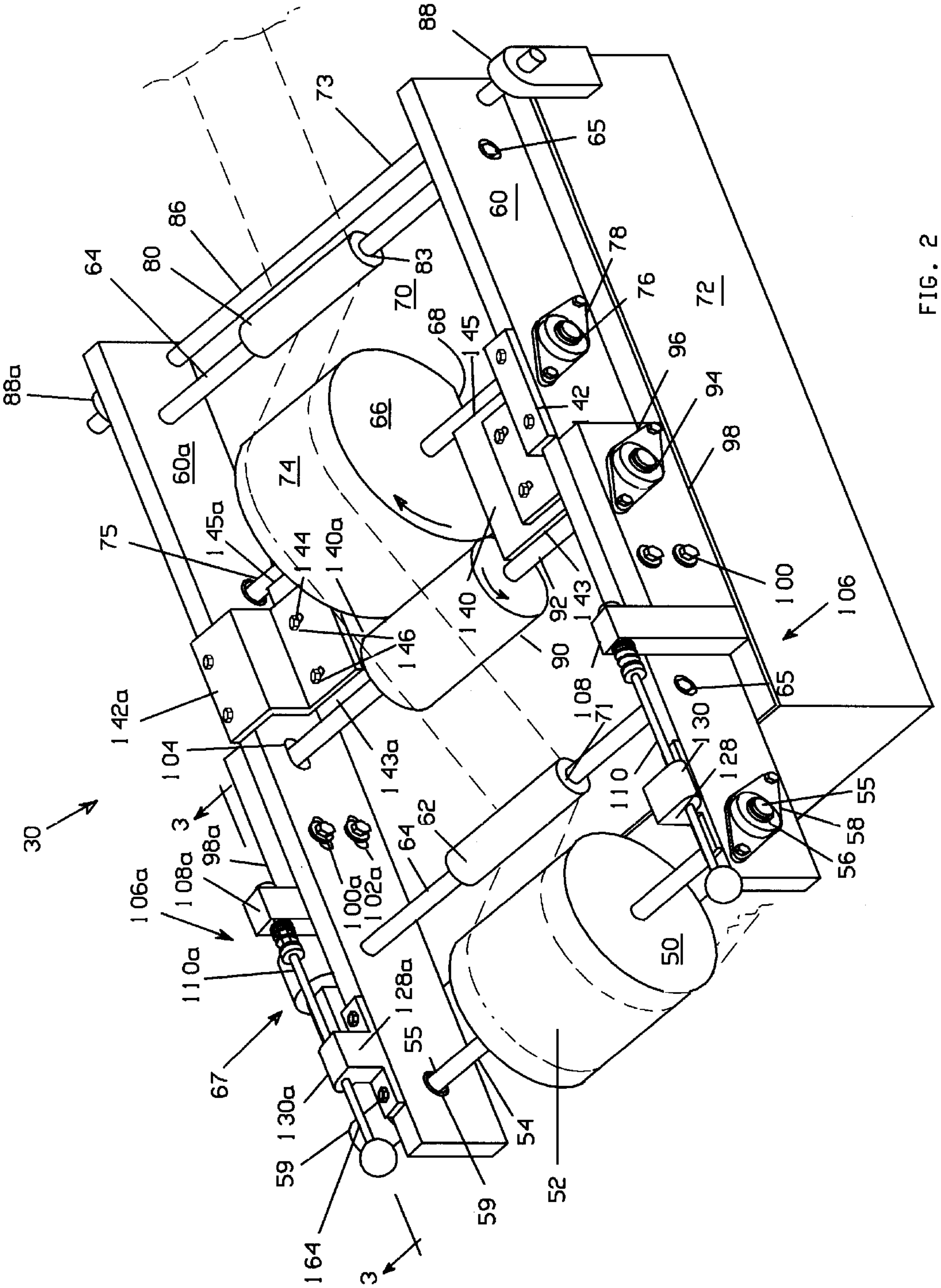
FIG. 2 is a perspective view of a gluing apparatus of the present invention.

Referring now to FIG. 2, one embodiment of gluing apparatus 30 is shown. In this view, like numbers designate like components on right and left sides of the apparatus, with numbers designating components on the left side bearing the suffix "a". A frame is constructed of side frame members 60 and 60*a* held in spaced relation by spacing shafts 64. Shafts 64 secure side frame members 60 and 60*a* together, as by fasteners such as bolts 65 extending through openings in each side frame member, the bolts each engaging a threaded opening in each end of shafts 64. Alternately, the frame may be of unitary construction, as by welding individual frame members together.

The paper web (dashed lines) from roller 28 (FIG. 1) initially passes over a drive roller 50 fixedly mounted on a shaft 54, with ends 55 of shaft 54 rotatably supported by antifriction bearings 56 (only 1 shown). Roller 50 is provided with a flat surface 52 having a relatively high coefficient of friction with respect to the paper web, and may be of a rubber-like compound, or a harder material treated or textured, so as to facilitate frictional contact with the moving paper web in order to drive other rollers of the glue applicator device, as will be further explained. Additionally, an increased surface area of the paper web with roller 50 is provided by drawing the paper web over about one-half the circumference of roller 50.

Antifriction bearings 56 are held in place by bearing blocks 58, 58*a* mounted as shown for block 58 to side frame members 60, 60*a*. The end 55 of shaft 54 passing through frame member 60*a* (FIG. 2*a*) is elongated, and is coupled to an overrunning or indexing clutch, such as clutch part number MR300a, manufactured by MORSE INDUSTRIAL CORPORATION, of ITHACA, N.Y. Also coupled to clutch 59 are sprockets 61 and 63, sprocket 61 coupled to a sprocket 65 mounted on an output shaft of a reduction gearmotor assembly 67 via chain 69 (dashed lines). Gearmotor 67 is selected such that the output shaft thereof rotates a a slow rate, such as about 4 RPM or so. Sprocket: 63 is coupled via chain 71 to drive other rollers of apparatus 30 at a faster rate, such as in the range of about 12–15 rotations per minute. This feature is useful when facility 10 is temporarily shut down, as where maintainance is required or the paper web tears or is resupplied. By maintaining constant rotation of glue applicator roller 66 and doctor roller 90, glue is prevented from hardening on these rollers, eliminating the necessity of cleaning these rollers after a brief shutdown of facility 10. With this construction, and when energized, gearmotor assembly 67 produces rotation of sprocket 61 through chain 69, driving the other rollers of apparatus 30 through rotation of sprocket 63 and chain 71. When shaft 54 is rotated by the paper web passing over roller 50, a higher rotation rate of shaft 54 is permitted by clutch 59 decoupling sprocket 63 from sprocket 61.

After passing over drive roller 50 (FIG. 2), the paper web is typically passed under crowned guide roller 62, which is used to provide additional wrap of the paper web around drive roller 50 when necessary. Roller 62 is rotatably mounted to spacing shaft 64, with antifriction bearings 71 mounted between shaft 64 and roller 62. When guide roller 62 is not used, the paper web is passed directly from drive roller 50 to glue applicator roller 66, which has a lower portion 68 immersed in liquid glue 70 in glue reservoir 72. Reservoir 72 may be a horizontally positioned pan or other container open on a top side, with apparatus 30 mounted at one end in pivotal relation with reservoir 72. The peripherial surface 74 of glue applicator roller 66 is a smooth, flat surface, which provides a thin, uniform layer of glue. Alternately, a textured roller may be used, which would impart a corresponding textured layer of glue to the paper web. Sides of roller 66 are normal to surface 74, and are smooth so that glue may be scraped therefrom. Glue applicator roller 66 is mounted to shaft 75, which in turn is supported by antifriction bearings 76 mounted in bearing blocks 78, 78*a* (only 1 shown), blocks 78 fixed to side frame members 60, 60*a* as earlier described. As such, liquid glue is applied to side 32 (FIG. 1) of the paper web as the web is passed over rotating glue applicator roller 66. Significantly, applicator roller 66 is rotated such that surface 74 moves at a slightly slower or faster rate, on the order of one half to one foot per minute, than the paper web, causing a wiping action that causes glue to be uniformly transferred from roller 66 to the web. After passing over roller 66, the paper web having glue applied to side 32 is passed under flat roller 80, which is rotatably mounted by antifriction bearings 83 to spacer shaft 64 in turn mounted as described to side frame members 60, 60*a*. A shaft 86 attached to apparatus 30 engages lugs 88, 88*a* of glue reservoir 72, or to base 18 where the glue reservoir is integral with or mounted within base 18. With this construction, glue applicator assembly 30 may be pivoted upwardly about shaft 86 for servicing and cleaning.

Figure 2B:
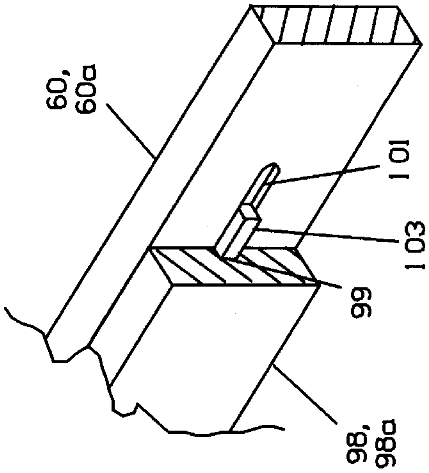
FIG. 2*b* is a broken-away view showing construction details of a sliding portion of an adjustment mechanism of the invention.
Figure 2A:
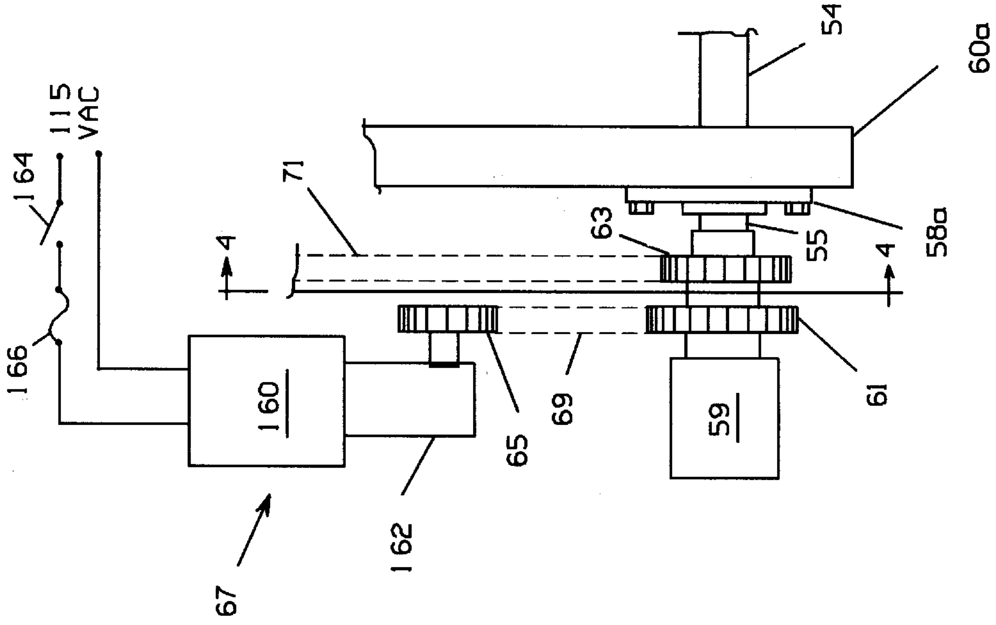
FIG. 2*a* is a partial view showing construction details of a clutch and motor assembly of the present invention.

For preventing excess glue from being applied to the paper web, a flat doctor roller 90 is adjustably mounted as shown in close proximity to glue applicator roller 66. Here, doctor roller 90 is mounted to a shaft 92 rotatably supported by antifriction bearings 94, these bearings mounted in bearing blocks 96, 96*a* (only 1 shown). Doctor roller 90 is driven to rotate in an opposite direction as glue applicator roller 66, so as to squeeze excess glue from applicator roller 66. Bearing blocks 96, 96*a* in turn are supported by adjustment plates 98, 98*a*, which are slidably mounted to side frame members 60, 60*a* by fasteners 100, 100*a*. Fasteners 100, 100*a* hold, but do not clamp, adjustment plates 98, 98*a* against side frame members 60, 60*a* respectively, so that adjustment plates 98, 98*a* may slide longitudinally along frame members 98, 98*a*, moving doctor roller 90 toward or away from glue applicator roller 66. Additionally, as shown in FIG. 2*b*, aligned longitudinal slots 99, 101 may be provided in adjustment plates 98, 98*a* and side frame members 60, 60*a*, respectively, with a key 103 closely engaging both of slots 99, 101. This arrangement assures a positive sliding motion of adjustment plates 98, 98*a* against side frame members 60, 60*a* while minimizing or eliminating vertical play of plates 98, 98*a*. Accomodation for longitudinal movement of plates 98, 98*a* with respect to fasteners 100, 100*a* is provided either in frame members 60, 60*a* in the form of slots 102 through which fasteners 100, 100*a* extend, along with slots 104 for accomodating longitudinal movement of shaft 92. As such, adjustment plates 98, 98*a* are longitudinaly movable to adjust a gap between glue applicator roller 66 and roller 90 to an initial value of about 0.002 inches, after which the gap is reduced until a uniform, thin layer of glue is applied to the web. Alternately, slots may be provided in adjustment plates 98, 98*a*, with fasteners or studs fixed in side frame members 60, 60*a*, and which extend through the slots in the adjustment plates.

Figure 3:
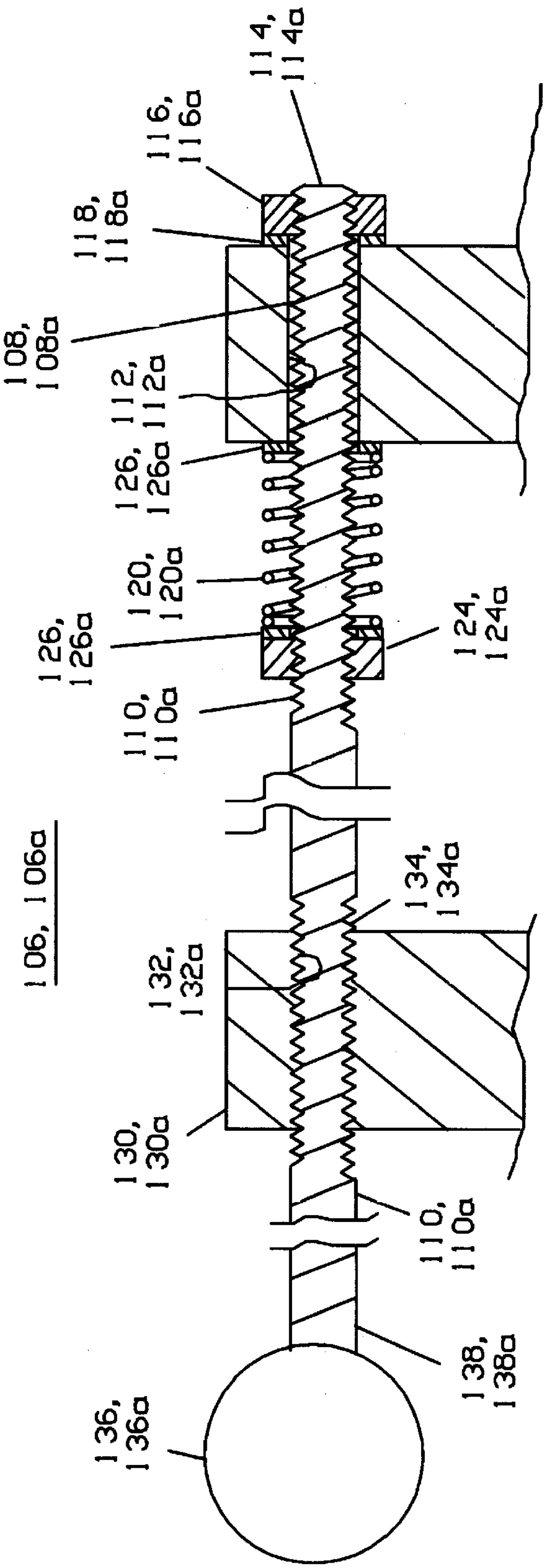
FIG. 3 is a sectional view taken along lines 3—3 of FIG. 2.

For closely adjusting the gap between glue applicator roller 66 and doctor roller 90, adjustment mechanisms 106, 106*a* are provided. Here, portions 108, 108*a* of adjustment plates 98, 98*a* extend upwardly above frame members 60, 60*a*, and rotatably engage adjustment rods 110, 110*a* as shown in FIG. 3. Threaded ends of rods 110, 110*a* extend through bores 112, 112*a* in portions 108, 108*a*, and are secured at ends 114, 114*a* by fasteners 116, 116*a*, which may be locking threaded split collers, with thrust washers 118, 118*a* positioned between the collers and portions 108, 108*a*. On the other side of portions 108, 108*a* are compression springs 120, 120*a* that are mounted between locking threaded split collers 124, 124*a* and washers 126, 126*a*. Springs 120, 120*a* apply a bias of about 100–150 pounds each between portions 108, 108*a* and collers 124, 124*a*, providing a flexable shock mounting of doctor roller 90 so that foreign objects or lumps of hardened glue caught between glue applicator roller 66 and doctor roller 90 will not indent or ruin surfaces of these rollers or bend the shafts of the rollers. In this instance, such an object caught between these rollers moves doctor roller 90 away from glue applicator roller 66 against springs 120, 120*a*.

Fixedly mounted to frame members 60, 60*a* are adjustment rod supports 128, 128*a*, (FIG. 2) which are provided with offset regions 130, 130*a*, these regions having a threaded bore 132, 132*a* (FIG. 3) that engages threaded portions 134, 134*a* of rods 110, 110*a*. Regions 130, 130*a* are offset so that bores 132, 132*a* are aligned with bores 112, 112*a* in portions 108, 108*a* of adjustment plates 98, 98*a*. Knobs or handwheels 136, 136*a* are mounted on ends 138, 138*a* of shafts 110, 110*a*, so that shafts 110, 110*a* may be rotated by hand in order to adjust the gap between glue applicator roller 66 and doctor roller 90.

For removing glue from sides of glue applicator roller 66 and doctor roller 90, which would otherwise migrate down the shafts of these rollers into the antifriction bearings, and as shown in FIG. 2, wipers 140, 140*a* are supported between upper and lower portions of brackets 142, 142*a*, with only upper portions of the brackets shown in FIG. 2. The lower portion of these brackets is simply a plate which serves to clamp the wipers against the upper portions of the brackets. These wipers may be constructed having wiping edges of a Teflon or Nylon-type material characterized by being softer than the metal of rollers 90 and 66 so that material of the wiper edges wears instead of material of the rollers. Brackets 142, 142*a* are mounted to an upper surface of side frame members 60, 60*a*, and are configured so as to closely position wiper edges 143, 143*a* closely proximate shaft 92, and edges 145, 145*a* closely positioned near shaft 75. The proximity of sides of wipers 140, 140*a* to shafts 92 and 75 may be from a few thousanths of an inch to about 0.020 inches or so. With the wipers constructed and positioned as described, side edges of wipers 140, 140*a* remove most of the glue on shafts 92 and 75, preventing glue from migrating down these shafts. Additionally, because these edges 143, 143*a* and 145, 145*a* do not contact shafts 92 and 75, wear on these wiper edges is eliminated. As an additional measure to keep glue out of the antifriction bearings, slingers (not shown) may be mounted to ends of shafts 92 and 75 near the bearings. In order to adjust wipers 140, 140*a* to lightly contact sides of rollers 90 and 66, fasteners 144 securing the wipers to the brackets pass through slots 146, allowing adjustment of the wipers to compensate for wear of the edges of the wipers that contact sides of rollers 66 and 90. Glue removed from sides of the rollers flows or drips back into glue reservoir 72 from wipers 140, 140*a*. Alternately, fasteners of the brackets may extend through elongated openings in the wipers (not shown) in order to facilitate adjustment of the wipers. While sides of rollers 90 and 66 are disclosed as being normal to the preipheral surfaces thereof, other configurations of these sides are possible, as long as wipers 140, 140*a* are configured to wipe these differently configured sides.

Figure 4:
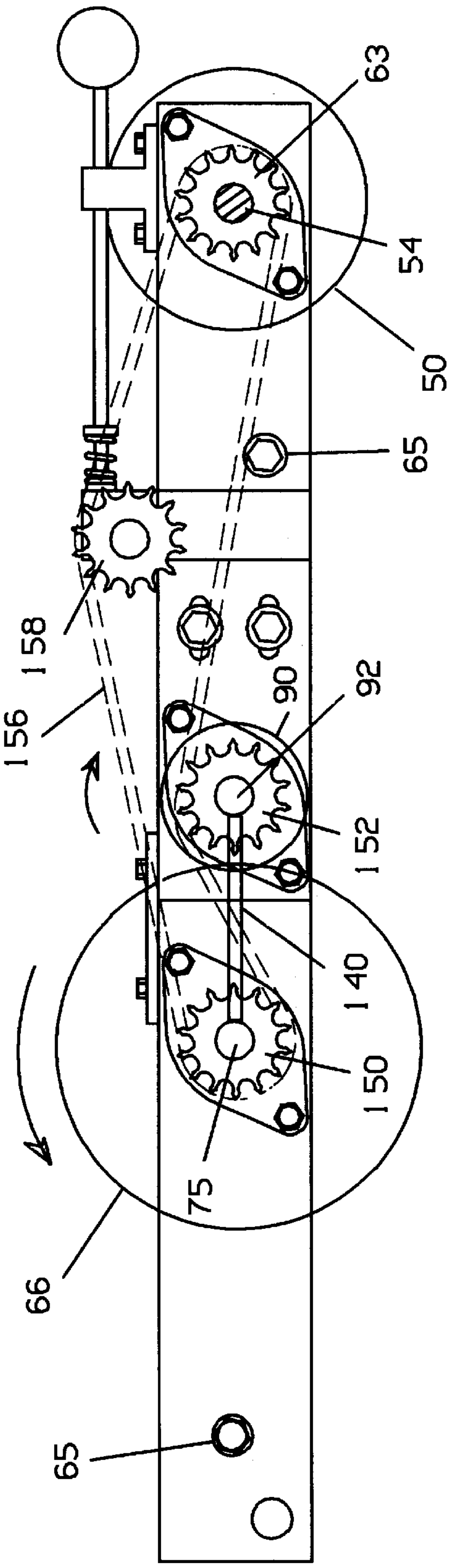
FIG. 4 is a side view of the gluing apparatus showing connections of various rollers thereof.

Referring now to FIG. 4, and by way of example, a driving system is shown for driving the various rollers of gluing apparatus 30 using movement of the paper web therethrough. Here, sprockets 150, 152, and 63 are mounted to shafts 75, 92, and 54, respectively, which in turn are fixed to rollers 66, 90, and 50, respectively. As described, drive roller 50 is provided with a surface 52 of frictional character, such as a rubber-like material, so that it is assured that roller 50 will be rotated as the paper web is drawn thereover at rates tip to 450 feet per minute. A driving chain 156 (dashed lines) adapted to mesh with teeth of the sprockets is connected as shown, so that as driving roller 50 is rotated, doctor roller 90 and glue applicator roller 66 are rotated via chain 156. A spring loaded tensioner sprocket 158 is conventionally mounted by means not shown for maintaining tension on chain 156. Size of sprocket 150 is selected to rotate glue applicator roller 66 at a rate such that the surface of the glue applicator roller moves generally at a slightly different speed, either slower or faster, than the paper web. This slight difference in speed between roller 66 and the paper web causes glue to be rubbed or wiped from the applicator roller 66 to the paper web.

A motor 160 (FIG. 2*a*) having a gear reduction unit 162 attached thereto is conventionally coupled via overrunning clutch 59 as described above, so that fairly brief interruptions of processing the paper web into paper cores, which interruptions being fairly typical, does not necessitate cleaning of gluing apparatus 30. During these interruptions, motor 160 is energized to rotate shaft 54 at a rate of about 12–15 rotations per minute or so, slowly rotating the rollers of the apparatus so that glue on applicator roller 66 and doctor roller 90 does not harden. When processing is resumed, the overrunning clutch decouples drive roller 61 from motor/reduction gearbox assembly 67 so that the paper web drives the other rollers at the faster rate while motor 160 is still energized. At this point, motor 160 may be left in an energized condition, or switched OFF by opening a power switch 164, interrupting power applied to motor 160. A fuse or circuit breaker-type device 166 is provided in a power line to motor 160, and is sized to interrupt power to motor 160 when the motor draws only slightly more current than its operating current. This prevents damage to motor 160 due to increased operational loads, as where excess evaporation of moisture has occurred from the liquid glue in glue reservoir 72, making it extremely viscous, or where a foreign object is caught between applicator roller 66 and doctor roller 90.

Having thus described my invention and the manner of its use, it is clear that incidental changes may be made thereto that fairly fall within the scope of the following appended claims, wherein I claim:

1. A glue applicator for applying a continuous layer of glue to a paper web pulled through the glue applicator by a paper core manufacturing facility comprising:

a horizontally extending, elongated frame having opposed sides, a liquid glue reservoir positioned below said frame for containing liquid glue, a rotatable glue applicator roller supported by said frame, with a lower periphery of said glue applicator roller immersed in said liquid glue and an upper periphery of said glue applicator roller being in contact with said paper web so as to apply said continuous layer of glue directly to said paper web as said paper web moves over said glue applicator roller, a rotatable doctor roller adjustably mounted to said frame adjacent said glue applicator roller so that a gap between said doctor roller and said glue applicator roller is adjustable for metering thickness of said continuous layer of glue, a rotatable drive roller supported by said frame, and coupled to rotate said glue applicator roller and said doctor roller as said paper web moves thereover, a wiper positioned at each end of said glue applicator roller and said doctor roller, each said wiper further positioned between said glue applicator roller and said doctor roller and having a single wiping edge common to ends of said glue applicator roller and said doctor roller so that each said single wiping edge removes excess glue from a respective end of said doctor roll and said glue applicator roll, whereby said paper web moving across said drive roller powers rotation of said glue applicator roller and said doctor roller so that said periphery of said glue applicator roller moves at approximately the same speed as said paper web, with said doctor roller being rotatable powered by said drive roller to meter thickness of said continuous layer of glue applied to said paper web.

2. A glue applicator as set forth in claim 1 further comprising a motor selectively operable to rotate said doctor roller and said glue applicator roller at a rotation rate slower than a rotation rate developed by movement of said paper web over said drive roller, so that when said paper web is not rotating said doctor roller and said glue applicator roller, said doctor roller and said glue applicator roller may be rotated by said motor, continuously applying said liquid glue to said glue applicator roller and said doctor roller, preventing said liquid glue from hardening on said glue applicator roller and said doctor roller.

3. A glue applicator as set forth in claim 2 wherein said motor includes an overrunning clutch, so that said motor may be operated with said paper web driving said drive roller, said glue applicator roller, and said doctor roller.

4. A glue applicator as set forth in claim 1 wherein a compression spring is utilized to support each end of said doctor roller in flexible relation, allowing said ends of said doctor roller to move independently in the event a hard object passes between said doctor roller and said glue applicator roller.

5. A glue applicator as set forth in claim 1 wherein said glue applicator roller, said doctor roller and said drive roller are each fitted with a sprocket at one end thereof, with a drive chain fitted about said sprockets so that as said paper web passes across said drive roller, said glue applicator roller and said doctor roller are rotated in opposite directions.

6. A glue applicator as set forth in claim 1 wherein a surface of a periphery of said drive roller is of frictional character.

7. A facility for manufacturing paper cores wherein a paper core winding apparatus pulls a paper web through a gluing apparatus comprising:

a relatively narrow paper web, a gluing apparatus for receiving said paper web and applying a continuous layer of liquid glue to one side thereof, said gluing apparatus comprising:

a horizontally extending frame having opposed sides, a liquid glue reservoir positioned below said frame for containing said liquid glue, a glue applicator roller supported by said frame for rotation in a direction corresponding to a direction of travel of said paper web, with a lower periphery of said glue applicator roller immersed in said liquid glue and an upper periphery of said glue applicator roller being in contact with said paper web so as to apply said continuous layer of liquid glue directly to said paper web as said paper web moves across said glue applicator roller, a doctor roller adjustably mounted to said frame adjacent and in front of said glue applicator roller with respect to a direction of travel of said paper web so that a gap between said doctor roller and said glue applicator roller is adjustable for metering thickness of said continuous layer of liquid glue, said doctor roller coupled for rotation in a direction opposite to that of said glue applicator roller, a rotatable drive roller supported by said frame, and coupled to power rotation of said glue applicator roller and said doctor roller as said paper web moves thereover, a wiper positioned at each end of said glue applicator roller and said doctor roller, each said wiper further positioned between said glue applicator roller and said doctor roller and having a single wiping edge common to ends of said glue applicator roller and said doctor roller so that each said wiping edge removes said liquid glue from a respective end of said doctor roller and said glue applicator roller whereby removed said liquid glue accumulates on a lower surface of said wiper facing said liquid glue reservoir and falls directly from said lower surface back into said liquid glue reservoir.

8. A facility as set forth in claim 7 wherein a surface of a periphery of said drive roller is of frictional character.

9. A facility as set forth in claim 7 further comprising a sprocket mounted at one end of each of said drive roller, said doctor roller and said glue applicator roller, and a chain fitted about each said sprocket so that said paper web moving over said drive roller rotates said glue applicator roller in a direction of travel of said paper web moving thereover and rotates said doctor roller in a direction opposite to rotation of said glue applicator roller.

10. A facility as set forth in claim 7 further comprising a selectively operable motor coupled to rotate said glue applicator roller and said doctor roller at a rate slower than a rotation rate developed by said paper web passing over said drive roller, so that glue applicator roller and said doctor roller may be rotated in the absence of said paper web, continuously applying said liquid glue to said glue applicator roller and said doctor roller, preventing said liquid glue from hardening on said glue applicator roller and said doctor roller.

11. A facility as set forth in claim 10 wherein said motor includes an overrunning clutch, so that said motor may be operated with said paper web driving rotation of said glue applicator roller and said doctor roller, whereby when said paper web stops driving rotation of said glue applicator roller and said doctor roller, said motor drives rotation of said glue applicator roller and said drive roller at said rate slower than a rotation rate developed by said paper web passing over said drive roller.

12. A glue applicator for use in construction of paper cores wherein a paper core winding apparatus pulls a paper web through said glue applicator, said glue applicator comprising:

a horizontally extending elongated frame having opposed sides, a liquid glue reservoir positioned below said frame for containing liquid glue, a rotatable glue applicator roller supported by said frame, with a lower periphery of said glue applicator roller immersed in said liquid glue, said glue applicator roller disposed to apply a layer of said liquid glue directly to a paper web moving thereover, a rotatable doctor roller adjustably mounted to said frame adjacent said glue applicator roller so that a gap between said doctor roller and said glue applicator roller is adjustable to meter thickness of said layer of liquid glue applied to said paper web by said glue applicator roller, a rotatable drive roller supported by said frame, and coupled to rotate said glue applicator roller and said doctor roller responsive to said paper web moving thereover, a wiper mounted at each end of said glue applicator roller and said doctor roller, each said wiper having a single wiping edge common to a respective said end of said glue applicator roller and said doctor roller, whereby said paper web moving over said drive roller rotates said glue applicator roller and said doctor roller to apply said layer of glue to said paper web and meter thickness of said layer of said glue applied to said paper web, with each said wiping edge removing excess glue from ends of said glue applicator roller and said doctor roller.

13. A glue applicator as set forth in claim 12 further comprising a motor selectively operable to rotate said doctor roller and said glue applicator roller at a rate slower than rotation thereof due to movement of said paper web across said drive roller, so that when said paper web is not rotating said doctor roller and said glue applicator roller, said doctor roller and said glue applicator roller may be rotated by said motor, continuously applying said liquid glue to said glue applicator roller, preventing said liquid glue from hardening on said glue applicator roller and said doctor roller.

14. A glue applicator as set forth in claim 13 wherein said motor includes an overrunning clutch so that said motor may be operated with said paper web rotating said drive roller, said glue applicator roller and said doctor roller, whereby when said paper web ceases to rotate said drive roller, said motor and said overrunning clutch begin to rotate said glue applicator roller and said doctor roller.

15. A glue applicator as set forth in claim 12 wherein a surface of said drive roller is of frictional character for frictional engagement with said paper web.

16. A glue applicator as set forth in claim 12 wherein each said wiper is provided with opposed wiping edges positioned to remove excess glue from shafts supporting said glue applicator roller and said doctor roller.

17. A glue applicator as set forth in claim 12 wherein each end of said doctor roller is independently mounted in flexible relation so as to allow solid objects to pass between said doctor roller and said glue applicator roller without damaging said glue applicator roller and said doctor roller.

18. A glue applicator as set forth in claim 12 wherein said frame is pivotally attached at one end to said liquid glue reservoir so that an opposite end of said frame may be lifted to provide access to a lower side of said glue applicator and said liquid glue reservoir.

* * * * *